US008200401B2

(12) United States Patent
Heidrich et al.

(10) Patent No.: US 8,200,401 B2

(45) Date of Patent: Jun. 12, 2012

(54) DETERMINING AND RECONSTRUCTING CHANGES IN LOAD ON LIFTING GEAR

(75) Inventors: Thomas Heidrich, Wilhelmshaven (DE); Hasko Karge, Wilhelmshaven (DE)

(73) Assignee: Manitowoc Crane Group France SAS, Ecully (FR)

(*) Notice: Subject to any disclaimer, the term of this patent is extended or adjusted under 35 U.S.C. 154(b) by 246 days.

(21) Appl. No.: 12/467,585

(22) Filed: May 18, 2009

(65) Prior Publication Data

US 2009/0287381 A1 Nov. 19, 2009

(30) Foreign Application Priority Data

May 19, 2008 (DE) ......................... 10 2008 024 215

(51) Int. Cl.

*G06F 7/70* (2006.01)
*G08B 21/00* (2006.01)
*B66C 13/06* (2006.01)
*B66C 13/16* (2006.01)
*B66C 13/18* (2006.01)

(52) U.S. Cl. .......... 701/50; 340/685; 212/270; 212/273; 212/278

(58) Field of Classification Search .................. 212/270, 212/273, 275, 278; 367/93, 31; 318/798, 318/800–803, 806–812, 98, 650, 449, 450, 318/453, 465, 469, 476, 432; 361/23, 30, 361/31, 78, 87–89, 91.1–94; 340/685; 701/50

See application file for complete search history.

(56) References Cited

U.S. PATENT DOCUMENTS

| | | | |
|---|---|---|---|
| 4,953,053 | A | 8/1990 | Pratt |
| 5,219,420 | A | 6/1993 | Kiiski et al. |
| 6,644,485 | B2 | 11/2003 | Uchida et al. |
| 2002/0144968 | A1 | 10/2002 | Ruddy |

FOREIGN PATENT DOCUMENTS

| | | | |
|---|---|---|---|
| CA | 2001046 | | 4/1990 |
| DE | 20318718 | U1 | 4/2004 |
| EP | 0749934 | A2 | 12/1996 |
| EP | 0638876 | | 11/1998 |
| EP | 0737851 | | 11/2001 |
| EP | 0611211 | B1 | 5/2003 |
| EP | 1103511 | B1 | 4/2005 |
| EP | 1818308 | A1 | 8/2007 |

*Primary Examiner* — Christopher J. Novosad

(74) *Attorney, Agent, or Firm* — Brinks Hofer Gilson & Lione; Steven P. Shurtz

(57) ABSTRACT

The invention relates to a method of determining changes in loads on lifting gear, whereby a change in load is determined within load curve data at a transition point of the load curve gradient, and whereby the load curve is broken down into discrete-time observation intervals at the transition points. It further relates to a method of reconstructing load situations on lifting gear, for which such a method of determining changes in load is used.

16 Claims, 3 Drawing Sheets

Schematic structure of a system operating with the new method

Real load situation recorded on lifting gear with interval threshold definition based on the new method Schematic structure of a system operating with the new method Real load situation recorded on lifting gear by detecting picking up and setting down of the load based on the method known from the prior art Real load situation recorded on lifting gear with interval threshold definition based on the new method

DETERMINING AND RECONSTRUCTING CHANGES IN LOAD ON LIFTING GEAR

CROSS REFERENCE TO PRIOR APPLICATION

This application is a Paris Convention Filing under 35 U.S.C. §119 and claims priority to and benefit from German Application DE 10 2008 024 215.2-22, filed on May. 19, 2008.

The invention relates to a method of determining and reconstructing changes in load on lifting gear. In particular, it relates to the field of lifting gear used on cranes, especially mobile cranes, and also lifting gear as a whole (e.g. crane/mobile crane), as well as the components directly or indirectly affected by the load change.

Methods of determining and reconstructing changes in load are generally used as a means of logging operation of the lifting gear. They are used to reconstruct accidents or for calculating charges based on payload. This information is also used as a basis for calculating structural strain on the lifting gear.

Figure 2A:
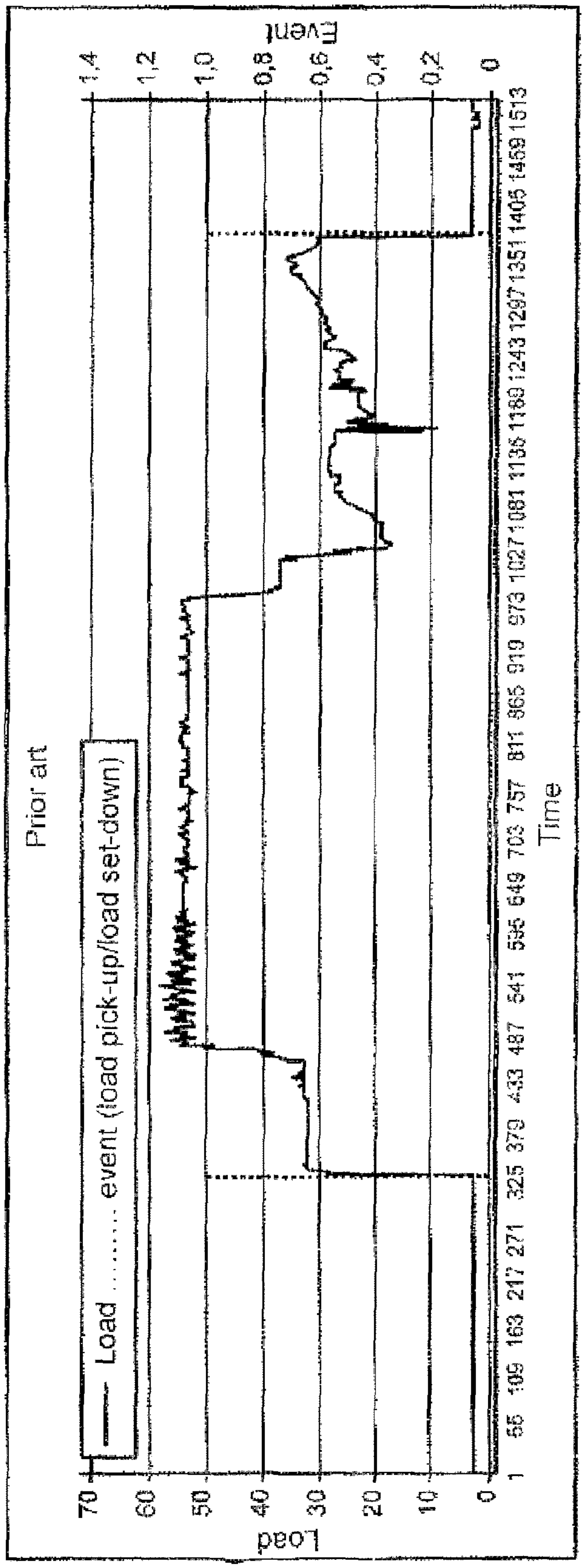

As known from the prior art, such load changes are determined by detecting the picking up of a load and setting down of a load. These load changes are detected with the assistance of additional information, such as actuation functions for example, which enable the lifting or lowering of a load to be anticipated. When plotted load curves have to be broken down for evaluation purposes, this breakdown is done on the basis of such additional information (actuation information) or on the basis of external events, such as the bridging of a safety device for example. In this respect, it is specifically assumed that the action of picking up a load is necessarily followed by the action of setting down a load and vice versa. The data sets created in this manner are stored in a data logger as a rule, with a view to detecting load situations subsequently and reconstructing them if necessary. These methods known from the prior art enable an evaluation interval to be considered on the basis of discrete time within thresholds known to the system, namely pick up load—set down load—pick up load, etc. . . (FIG. 2*a* shows such a load-time curve broken down in this manner). However, they are relatively unrealistic if based on simplified assumptions for load-change events, which makes service life calculations inaccurate. These methods known from the prior art also reach their limits in situations where the load is not static and instead the load changes during the course of the lifting operation.

Accordingly, the objective of this invention is to propose a method of determining changes in load on lifting gear which at least partially overcomes the disadvantages of the prior art. In particular, the intention is to enable a reliable reconstruction of load changes so that calculations based on them can be optimised.

This objective is achieved by the invention on the basis of a method of determining changes in load on lifting gear as defined in claim 1. The dependent claims define preferred embodiments of the invention.

For the purposes of the method proposed by the invention, a change in load within load progression data is determined at a transition point of the load curve gradient. Furthermore, the load curve is broken down into discrete-time observation intervals at the transition points. In other words, this invention discloses a method of breaking down load curves. The observation intervals created in this manner enable data-reduced information to be generated, from which any load curves can be subsequently reconstructed on a continuous time basis because they are not based on detecting the action of picking up and setting down a load.

Specifically using the load curve gradient makes it possible to obtain an optimised breakdown and hence evaluation using a piece of information intrinsic to the load curve, in other words one which does not have to be determined separately.

The process of determination based on the method proposed by the invention may be applied using stored load curve data but also using real-time load curve data. In particular, the load curve is plotted, i.e. stored, and a memory impulse created or inserted at transition points as a load change indicator or load change event.

In one embodiment of the invention, observation intervals which are negligible, and are obviously so or are so based on an exclusion criterion, are not taken into account or are suppressed. This being the case, the exclusion criterion may be a time-based criterion in particular (e.g. a short interval) or a criterion which makes allowance for external influences on the load curve (external events, control data).

The transition point may be determined or may be inserted in the load curve as a load curve transition if the load curve gradient changes sign or changes to zero. Furthermore, a transition point can be determined or inserted if the gradient changes consecutively more than once with the same sign, in other words when the load curve continues to rise or fall but the steepness of the curve changes at the same time.

Based on a somewhat broader aspect, the invention also relates to a method of reconstructing load situations on lifting gear and the method used to determine changes in load is based on the different embodiments described above. In particular, allowance can also be made for other changes in load when reconstructing the load situation, either originating from operating data of the lifting gear or determined during specific operating situations.

Figure 2B:
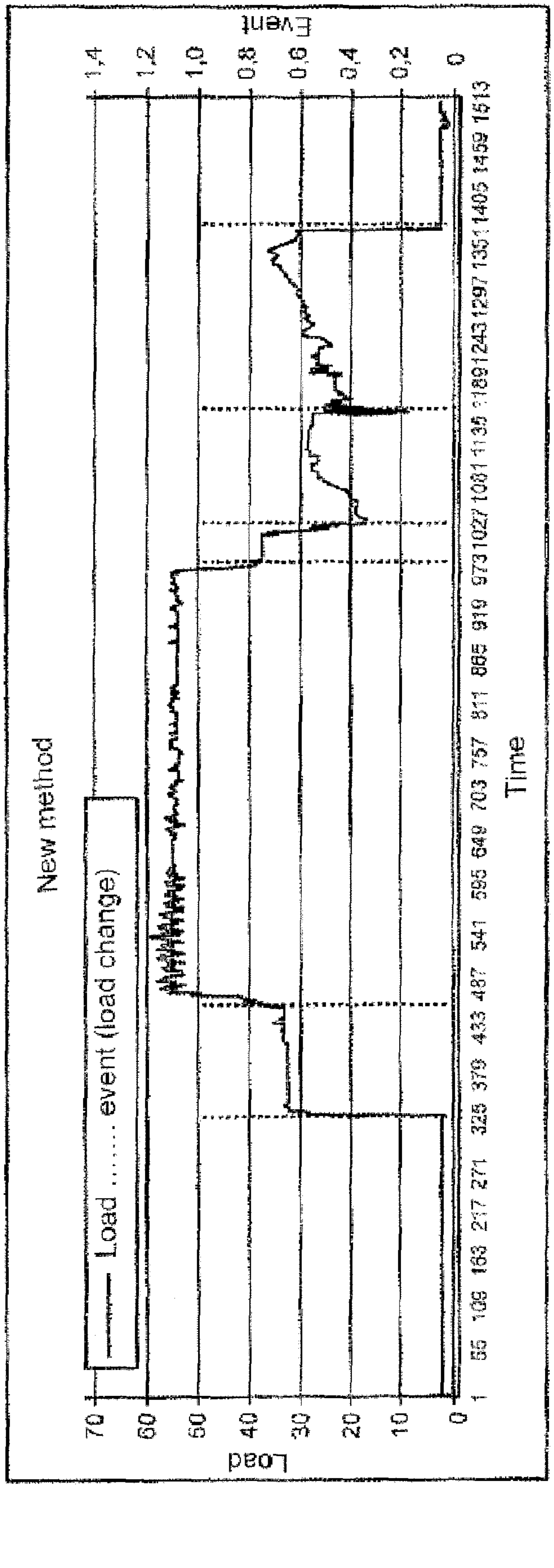

The invention will be explained in more detail below with reference to embodiments and with the aid of the appended graphs. All the described features may be used individually and in any practical combination. The appended graphs illustrate the following FIG. 1 a schematic system design for the method proposed by the invention;

FIG. 2*a* a load curve plotting a breakdown of events based on the prior art; and FIG. 2*b* a load curve with a breakdown based on this invention.

In terms of one particular embodiment, this invention can also be described as disclosing a method of analysing changes in load on lifting gear with a view to evaluating and reconstructing load situations, which is not primarily or not exclusively based on detecting the start of lifting and end of lifting. An evaluation unit breaks down the curve plotting the load into discrete-time observation intervals and every load change can be applied as a means of breaking down an evaluation interval. The breakdown (load change event) is performed on the basis of changes in gradient in the load curve and specifically, load changes offset from one another in time but with the same gradient sign can be used to this end as a means of breaking down the evaluation interval. FIG. 2*b* illustrates a more pronounced breakdown (compared with FIG. 2*a*) of the load curve in which the relevant gradient changes have been taken into account. From the information relating to load, therefore, a gradient is formed, and a memory impulse is generated accordingly from the transitions of the load gradient, namely at the respective event (transition). The data used for this purpose may be stored data or data recorded in real time which contains direct or indirect information about the current load on the lifting gear.

The method proposed by the invention therefore enables load changes to be reconstructed continuously over time, basically without having to detect the picking up of a load or setting down of a load, and therefore also enables loads which change during a lifting operation to be reconstructed.

Figure 1:
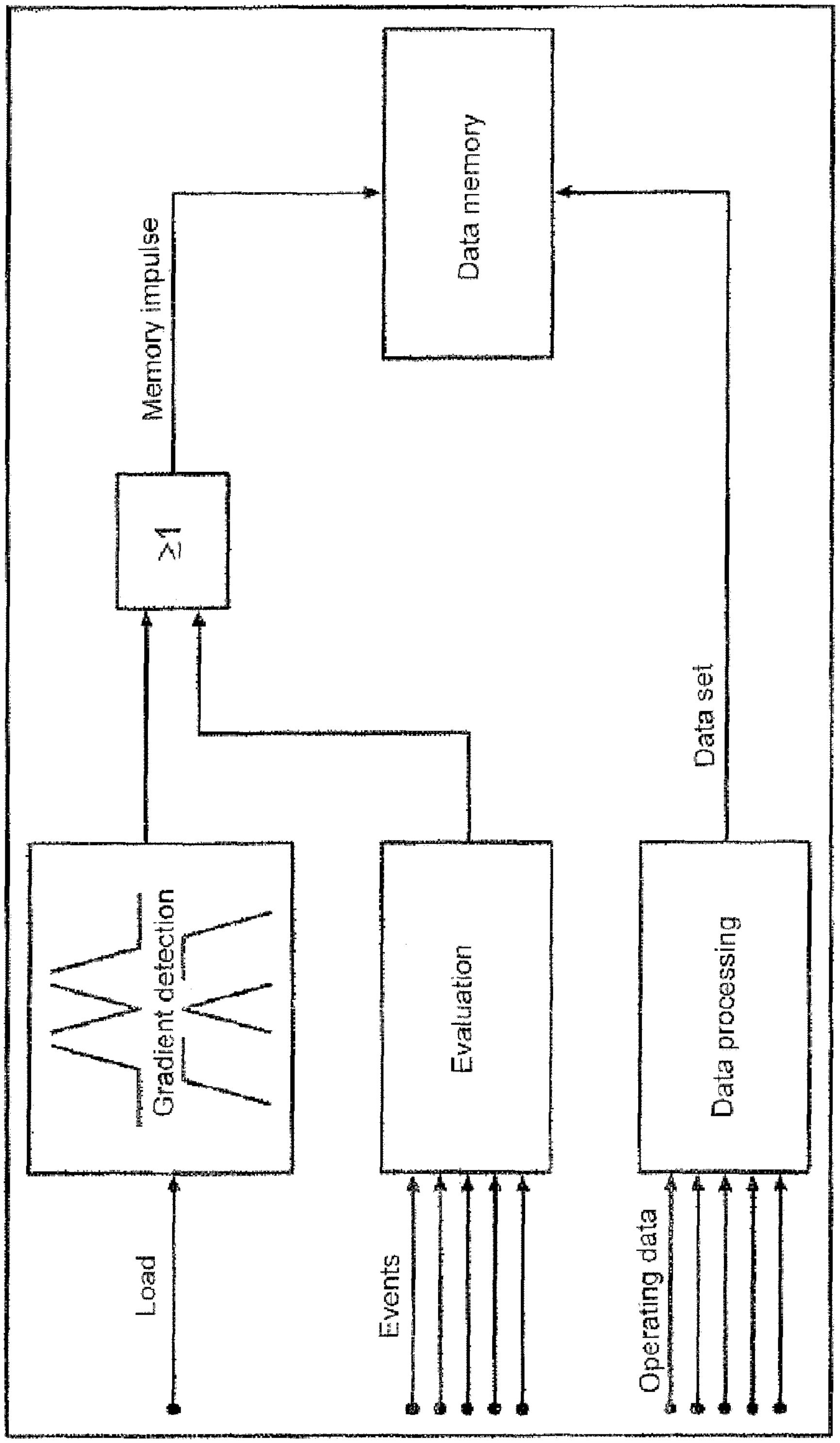

Naturally, however, it would also be possible to process other information known to the system in addition to the information obtained as proposed by the invention in order to obtain the best optimised results possible. For example, events intended to be considered separately at a later stage (e.g. operating a safety device) may generate an additional memory impulse or eliminate another one. In FIG. 1, the load gradient detection and the sequence of events mentioned immediately above are shown in the top part, and the information relating to the load gradient as well events occurring during operation are subjected to an evaluation and then stored in the data memory as a memory impulse. In this respect, it is possible to store raw data or processed data, the validity range of which falls between a previous memory impulse and a new memory impulse.

However, FIG. 1 also illustrates how data originating from operation of the lifting gear is processed and can additionally be used as an input data set for the data memory. Together with the data obtained as proposed by the invention (evaluated gradient detection), this system does mean that a larger amount of data has to be stored but enables a more detailed reconstruction of any load curves, depending on the stored data. Moreover, a statistical evaluation of the observation intervals created can be used to calculate, and during the reconstruction evaluate, structural strain on the lifting gear.

The invention claimed is:

1. A method of determining changes in load on lifting gear, whereby a change in load is determined within load curve data at a transition point of the load curve gradient, whereby the load curve is broken down into discrete time observation intervals at the transition points, whereby an impulse is created at transition points serving as a load change event in the load curve, and whereby the observation intervals created in this manner enable data-reduced information to be generated.

2. A method as claimed in claim 1, whereby the process of determination takes place using stored load curve data.

3. A method as claimed in claim 1, whereby the process of determination takes place using real-time load curve data.

4. A method as claimed in claim 1, whereby the load curve is stored, and said impulse is a memory impulse.

5. A method as claimed in claim 1, whereby observation intervals that are negligible, and are based on an exclusion criterion, are not taken into account or are suppressed, and the exclusion criterion is a time-based criterion or a criterion which makes allowance for external influences on the load curve in particular.

6. A method as claimed in claim 1, whereby a transition point is determined if the load curve gradient changes sign or changes to zero.

7. A method as claimed in claim 1, whereby a transition point is determined if the gradient changes but keeps the same sign, in particular changes consecutively more than once with the same sign.

8. A method of reconstructing load situations on lifting gear, whereby a method as claimed in claim 1 is used to determine changes in load.

9. A method as claimed in claim 8, whereby allowance is made for other changes in load which originate from operating data of the lifting gear or are determined in respect of special operating situations.

10. A method as claimed in claim 1, wherein the observation intervals created enable data-reduced information to be generated from which any load curves can be subsequently reconstructed on a continuous basis.

11. A method of determining changes in load in a mobile crane comprising:

storing load data representative of the load placed upon said mobile crane and creating a load curve;

evaluating said stored load data in an evaluation unit to break down said load data into discrete evaluation intervals;

wherein said evaluation intervals are determined based upon at least one transition point indicated by a signal impulse representing a load change event;

wherein said transition point load change event is detected by analyzing load curve gradients generated from said load curve; and, removing discrete evaluation intervals from analysis of data based upon a predefined exclusion criteria.

12. The method of claim 11 wherein said load change event transition point is determined when said load curve gradient changes signs over a data interval.

13. The method of claim 11 wherein said load change event transition point is determined when said load curve gradient changes to zero over a data interval.

14. The method of claim 11 wherein said load change event transition point is determined when said load curve gradient changes to a predefined value over a data interval.

15. The method of claim 11 wherein said exclusion criterion is a time based criterion.

16. The method of claim 11 wherein said exclusion criterion is based upon external influences on said load data.

* * * * *